March 14, 1944.    U. MEININGHAUS    2,344,100
RADIAL FLOW TURBINE
Filed Feb. 19, 1941    2 Sheets-Sheet 1

INVENTOR
U. Meininghaus
BY
Lackenbach Hirschman
ATTORNEYS

March 14, 1944.  U. MEININGHAUS  2,344,100
RADIAL FLOW TURBINE
Filed Feb. 19, 1941  2 Sheets-Sheet 2

Patented Mar. 14, 1944

2,344,100

UNITED STATES PATENT OFFICE 2,344,100

RADIAL FLOW TURBINE

Ulrich Meininghaus, Mulheim-Ruhr, Germany; vested in the Alien Property Custodian Application February 19, 1941, Serial No. 379,610
In Germany February 29, 1940

5 Claims. (Cl. 253—46)

The present invention relates to rotary machines such as steam or gas turbines in which a working medium flows through a plurality of blades in a radial direction, varying in pressure during such flow.

It is the general object of the invention to provide an improved balancing of the thrusts of the discs carrying the radially traversed blades, and in particular to balance the thrusts of a plurality of such bladed discs presenting more than two planes of rotating discs by the thrust of one single inwardly traversed labyrinth and yet to secure an almost perfect balance under all conditions. Other, more specific objects of the invention will appear from the detailed description hereinafter.

Figure 1:
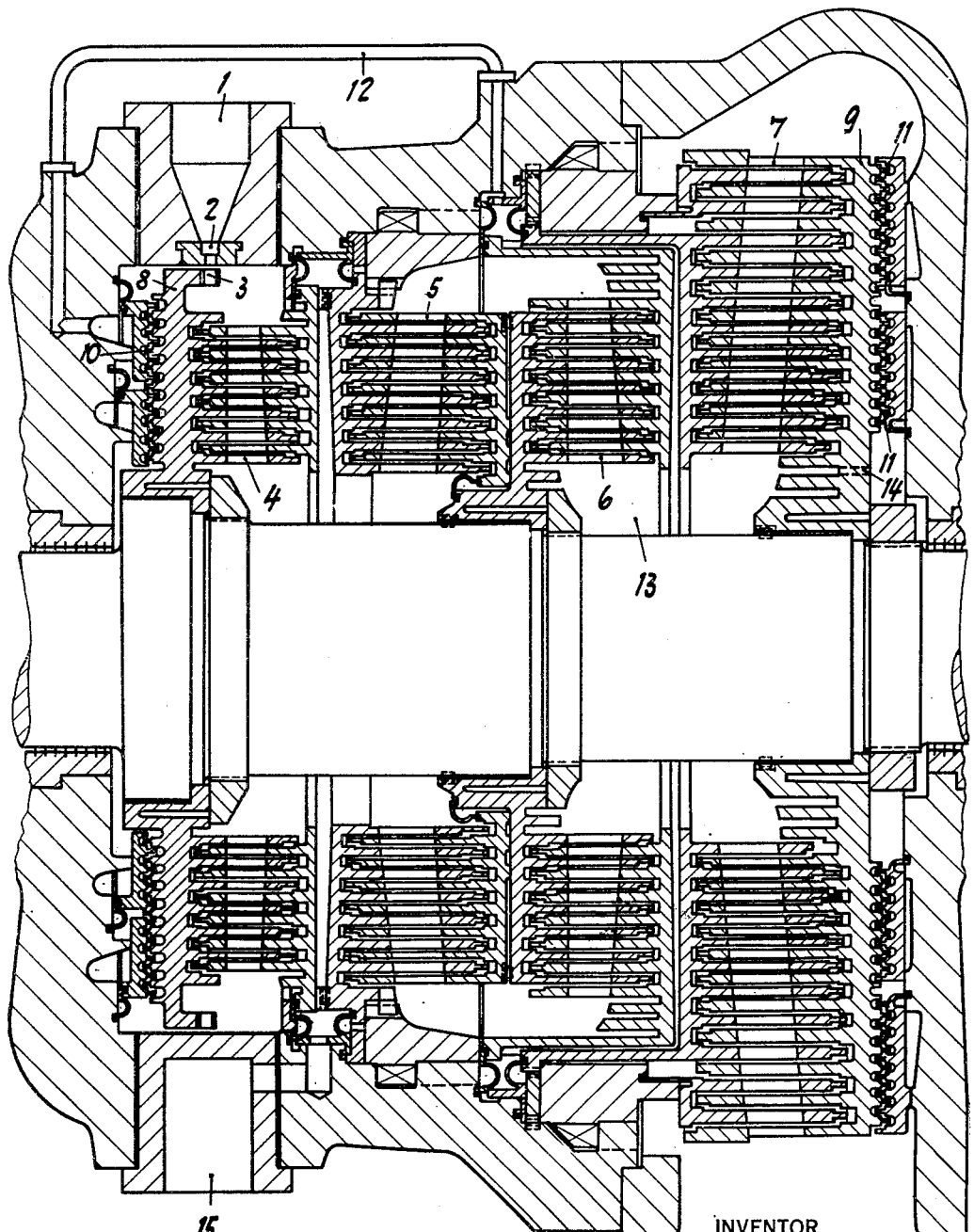
Figure 2:
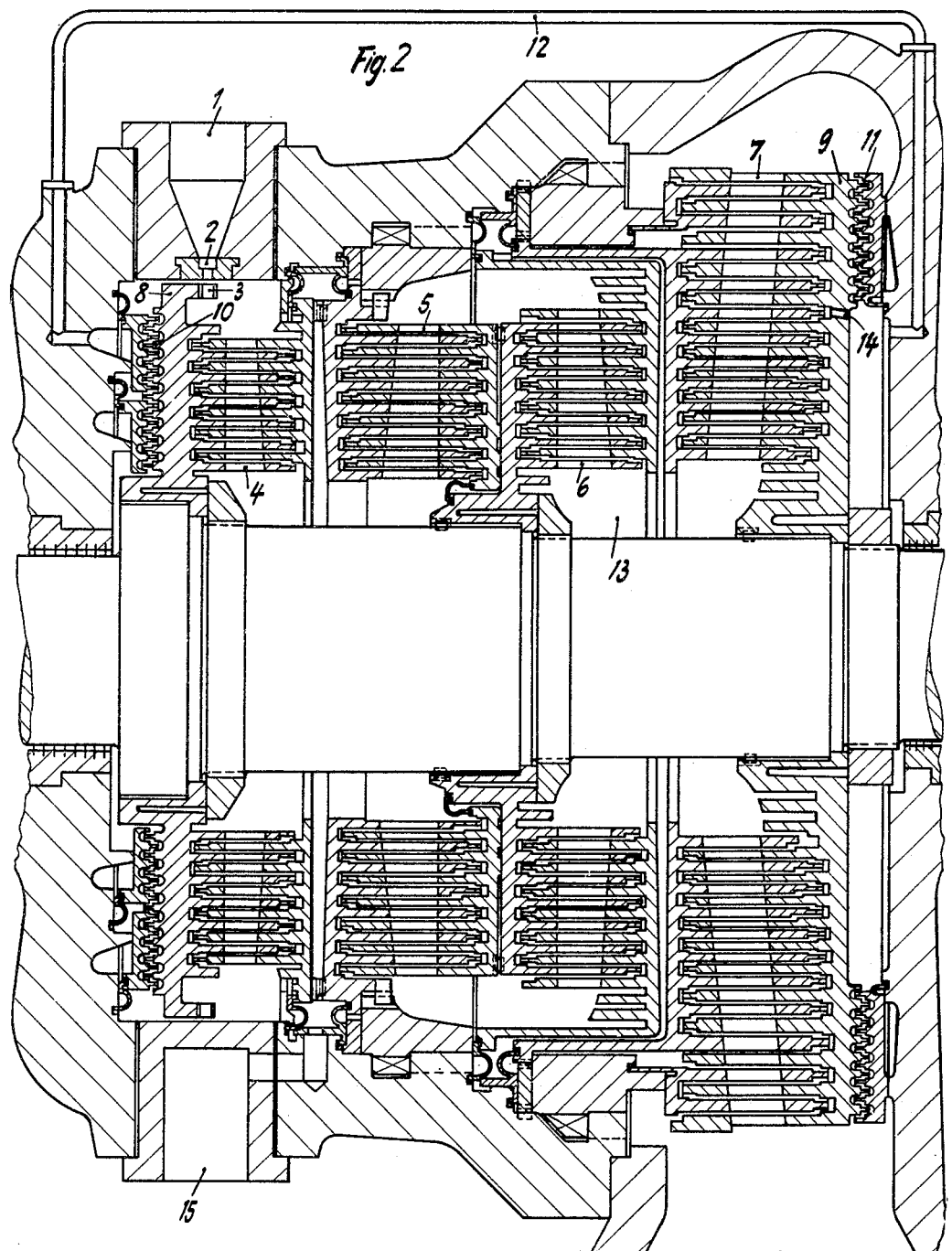

The accompanying drawings illustrate by way of example two embodiments of the invention. Figs. 1 and 2 of the accompanying drawings are vertical sections through radial flow steam turbines constructed according to the invention.

In Fig. 1 the steam enters the turbine at 1, enters the nozzles 2 and impinges the blades 3 of the velocity stage and then flows through the radially traversed reaction blades 4 to 7 representing four planes of rotating blades. The rear sides of the wheels 8 and 9 which carry the blades 3 and 7 are each fitted with a labyrinth packing 10 and 11. The labyrinth packing 10 is connected at its outer circumference with the space behind, or at the discharge side of, the nozzles 2, that is with the steam before it enters the first radial flow blading 4. At its inner half, it is connected with the space 13 between the bladings 6 and 7 by means of the pipe 12. The steam of this space 13 flows to the labyrinth packing 11 through the holes 14 in the wheel 9. The labyrinth packing 11 equalizes in good approximation the axial thrust of the blading 7. It would be possible to guide the leaking steam from the pipe 12 directly to the labyrinth packing 11, but with the illustrated arrangement I gain the advantage that the hot leakage steam increases the work transformed in the blading 7 and that comparatively cold steam which gave off part of its heat content in the bladings 4 to 6 enters the labyrinth packing 11. The flange 15 between the bladings 5 and 4 may serve for admitting by-pass-steam or for bleeding.

By leading the first connection of the inner part of the inwardly traversed labyrinth packing 10 with the stream of working medium flowing through the blading, by means of the pipe 12 to a point behind the second plane of the radially traversed blading 5, but before the outlet of the last plane of the radially traversed blading 7 I obtain for the first time a characteristic of the change in thrust for the inwardly traversed labyrinth packing 10 which coincides surprisingly well with the characteristic of change in thrust for the radial flow blading. Generally these characteristics differ to a degree that makes the otherwise convenient arrangement of the inwardly traversed labyrinth packing unfitted for balancing the thrust of high pressure turbines. The main reason for this disadvantage lies in the fact that the diameters of the labyrinths and therewith the size of the throttling areas decrease whilst the steam expands. The best effect is reached when the first connection of the inner part of the inwardly traversed labyrinth packing 10 with the steam flow through the blading is led as shown in Fig. 1 by means of the pipe 12 to a point between the third plane 6 and the fourth plane 7 of the radially traversed blading. It is then possible to admit by-pass-steam or to bleed steam at 15 between the second and third planes 5 and 6 without disturbing the balance of the thrusts. I prefer to provide an additional labyrinth packing 11 which is traversed in an outward direction to relieve the thrust of the labyrinth packing 10 at least by the thrust of one plane of the radial flow blading. Such outwardly traversed labyrinth packing 11 may advantageously be arranged at the rear side of the last wheel 9 and balance approximately the axial thrust of the blading 7 of such wheel. By such arrangement I obtain a practically perfect balance under all conditions with simple parts and with great compactness of structure. When the steam volume is large, the wheel 9 may carry on the rear side also blades traversed parallel to the blading 7 instead of the labyrinth packing 11.

In Fig. 2, for which the same reference characters apply as for Fig. 1, the inner part of the outwardly traversed labyrinth packing 11 is omitted up to a diameter which about corresponds to the mean outer diameter of the bladings 4, 5 and 6. The connection of the inner part of the inwardly traversed labyrinth packing 10 with the steam flow in the blading leads through pipe 12 to the inner diameter of the outwardly traversed labyrinth packing 11 and through the holes 14 in the wheel 9 to the corresponding point of the blading 7. With this arrangement I balance the sum of the thrusts of the bladings 4, 5, 6 and of the inner part of the blading 7 by the thrust of the inwardly traversed labyrinth packing 10. Only the thrust of the outer rim of the blading 7 is balanced by the outwardly traversed labyrinth packing 11. As the areas of the bladings 4 to 7, so far as they are balanced by the labyrinth packing 10, are approximately equal, any change in the course of the pressure drop through such blading will scarcely affect the balance. The pressure at the shaft glands is further reduced and the arrangement simplified as compared with Fig. 1. But the perfectness of balance under all conditions is best with the arrangement of Fig. 1.

Obviously, my invention is not restricted to rotary machines of the specific form illustrated, but, for example, may be used with machines having axially traversed blades or labyrinths which are staggered in radial direction.

I claim:

1. In a rotary machine, such as a reaction steam or gas turbine, the combination of a shaft, rotating discs arranged on said shaft, a plurality of radially traversed rows of blades on each of said discs and arranged to be impinged by a working medium, there being more than three planes of rotating discs, stationary discs carrying blades cooperating with said rotating discs, the working medium flowing at different average pressures along the two sides of at least certain of said rotating discs and moving in the same general axial direction, and thus exerting axial thrusts upon said shaft in such direction, and a radially traversed labyrinth packing on the unbladed side of the first impinged rotating disc, the outer diameter of such labyrinth packing being connected with the stream of the working medium flowing through the machine at a point in advance of the entry of the working medium into the reaction blading, and the immediately next connection with the stream of working medium flowing through the machine being provided at the inner part of such labyrinth packing and leading to a point behind that radial plane of the reaction blading which is the second in the direction of the flow of the working medium, but in advance of the last row of reaction blading.

2. In a rotary machine, such as a reaction steam or gas turbine, the combination according to claim 1, wherein the immediately next connection with the stream of the working medium flowing through the machine at the inner part of such labyrinth packing leads to a point between the third and the last radial plane of the reaction blading seen in the direction of the flow of the working medium.

3. In a rotary machine, such as a reaction steam or gas turbine, the combination of a shaft, rotating discs arranged on said shaft, a plurality of radially traversed rows of blades on the inner side of the end discs and on both sides of the central disk and arranged to be impinged by a working medium, there being more than three planes of rotating disks, stationary disks carrying blades cooperating with said rotating disks, the working medium flowing at different average pressures along the two sides of at least certain of said rotating disks and moving in the same general axial direction and thus exerting axial thrusts upon said shaft in the same direction, and radially traversed labyrinth packings on the unbladed outer sides of said end disks, the outer diameters of such labyrinth packing being in open connection with the outer diameters of the bladings on the other sides of said disks and the inner parts of such labyrinth packings being both connected with some point in the stream of working medium flowing through the reaction blading.

4. In a rotary machine, such as a reaction steam or gas turbine, the combination according to claim 3, wherein the inner parts of said labyrinth packings are both connected with a point in the stream of working medium between the third and the last radial plane of the reaction blading seen in the direction of the flow of the working medium.

5. In a rotary machine, such as a reaction steam or gas turbine, the combination according to claim 3, wherein the inner parts of said labyrinth packings are both connected with a point in the stream of working medium within the last radial plane of the reaction blading at a diameter which corresponds to the mean outer diameter of the other radial flow blading groups.

ULRICH MEININGHAUS.